(12) United States Patent
Mischler et al.

(10) Patent No.: US 7,509,718 B1
(45) Date of Patent: Mar. 31, 2009

(54) MACHINE TOOL WITH SELECTIVE DRIVE MOTOR POSITIONING

(75) Inventors: Peter L. Mischler, Rockton, IL (US); Randal S. VonMoll, Batavia, OH (US)

(73) Assignee: Cincinnati Machine, LLC, Hebron, KY (US)

( * ) Notice: Subject to any disclaimer, the term of this patent is extended or adjusted under 35 U.S.C. 154(b) by 0 days.

(21) Appl. No.: 12/098,121

(22) Filed: Apr. 4, 2008

(51) Int. Cl.
*B23C 1/027* (2006.01)

(52) U.S. Cl. ............................ 29/33 P; 409/235
(58) Field of Classification Search ............. 29/33 P, 29/563; 409/235, 202, 212, 183, 185, 204, 409/206; 408/234
See application file for complete search history.

(56) References Cited

U.S. PATENT DOCUMENTS

| | | | | |
|---|---|---|---|---|
| 4,858,290 A * | 8/1989 | Hirose et al. | ................ | 29/35.5 |
| 5,375,952 A * | 12/1994 | Line | ................ | 409/202 |
| 6,519,823 B1 * | 2/2003 | Sugata et al. | ................ | 409/235 |
| 6,551,038 B1 * | 4/2003 | Sugata et al. | ................ | 409/235 |
| 6,843,624 B2 * | 1/2005 | Sugata et al. | ................ | 409/235 |
| 7,189,194 B1 * | 3/2007 | Takayama et al. | ................ | 409/235 |
| 7,273,335 B2 * | 9/2007 | Furuhashi et al. | ................ | 409/202 |
| 7,437,810 B2 * | 10/2008 | Ota | ................ | 29/33 P |
| 2006/0130311 A1 * | 6/2006 | Kikuchi | ................ | 29/563 |
| 2006/0260907 A1 | 11/2006 | Ota | | |
| 2008/0044246 A1 * | 2/2008 | Gueli et al. | ................ | 409/202 |

FOREIGN PATENT DOCUMENTS

| | | | |
|---|---|---|---|
| JP | 02-279249 A | * | 11/1990 |
| JP | 04-283037 A | * | 10/1992 |
| JP | 2003-266257 A | * | 9/2003 |

* cited by examiner

*Primary Examiner*—Erica E Cadugan
(74) *Attorney, Agent, or Firm*—Reising Ethington P.C.

(57) ABSTRACT

The frame of a machine tool forms a closed force loop design that surrounds a workzone containing the spindle head. The X, Y, and Z-axis drive systems are all mounted outside of the machine to shield them from contamination and debris generating during the machining process, and for ease of maintenance without having to enter the machine or remove workzone covers to access them. The X and Y-axis drives are mounted on stationary parts of the machine, eliminating the need for flexible cables to power and control these drives and reducing the mass of the moving elements of the machine.

7 Claims, 4 Drawing Sheets

MACHINE TOOL WITH SELECTIVE DRIVE MOTOR POSITIONING

FIELD OF THE INVENTION

A machine tool has drive motors, drive elements and linear feedback for the X, Y, and Z-axis drives positioned so that they are on the exterior or perimeter of the machine for maintenance and repair purposes, and to keep these elements outside of the workzone.

BACKGROUND OF THE INVENTION

Machining operations performed by a machine tool result in a large amount of coolant and machining debris to be thrown around by the working tool. Drive motors and ways for the X, Y, and Z axis of the machine that are located in the workzone are protected from contamination by sealed workzone covers. When maintenance or replacement of the drive motors or ways is required, personnel have to enter the wet and dirty workzone and remove the workzone covers, breaking the seals. When maintenance is completed, the workzone covers have to be replaced and resealed. It would be desirable for the X, Y, and Z axis drive motors and ways to be located on the exterior or perimeter of the machine so that they could be maintained and serviced without requiring the operator to enter the machine itself or the workzone and remove workzone covers in order to have access to these elements.

BRIEF SUMMARY OF THE INVENTION

The X, Y, and Z-axis drive motors are all mounted on the exterior or perimeter of the machine to shield them from contamination and debris generating during the machining process, and to permit maintenance without having to enter the machine or remove workzone covers in order to have access to them. The X-axis drive is shielded from the workzone by an X-axis wall that is positioned between the X-axis drive and the workzone. The Y-axis drive motors and ways are mounted on the Y-axis column on the opposite side of the Y-axis column from the workzone. The Z-axis drive and ways are mounted on a saddle on the opposite side of the Y-axis column from the workzone. All of the X, Y, and Z-axis drive systems are removable from the machine from outside of the perimeter of the machine. The design and positioning of the X and Y-axis drives allows them to be mounted on a stationary part of the machine, eliminating the need for flexible cables to power and control these drives, and reduces the mass of the moving elements of the machine.

DETAILED DESCRIPTION OF THE INVENTION

Figure 1:
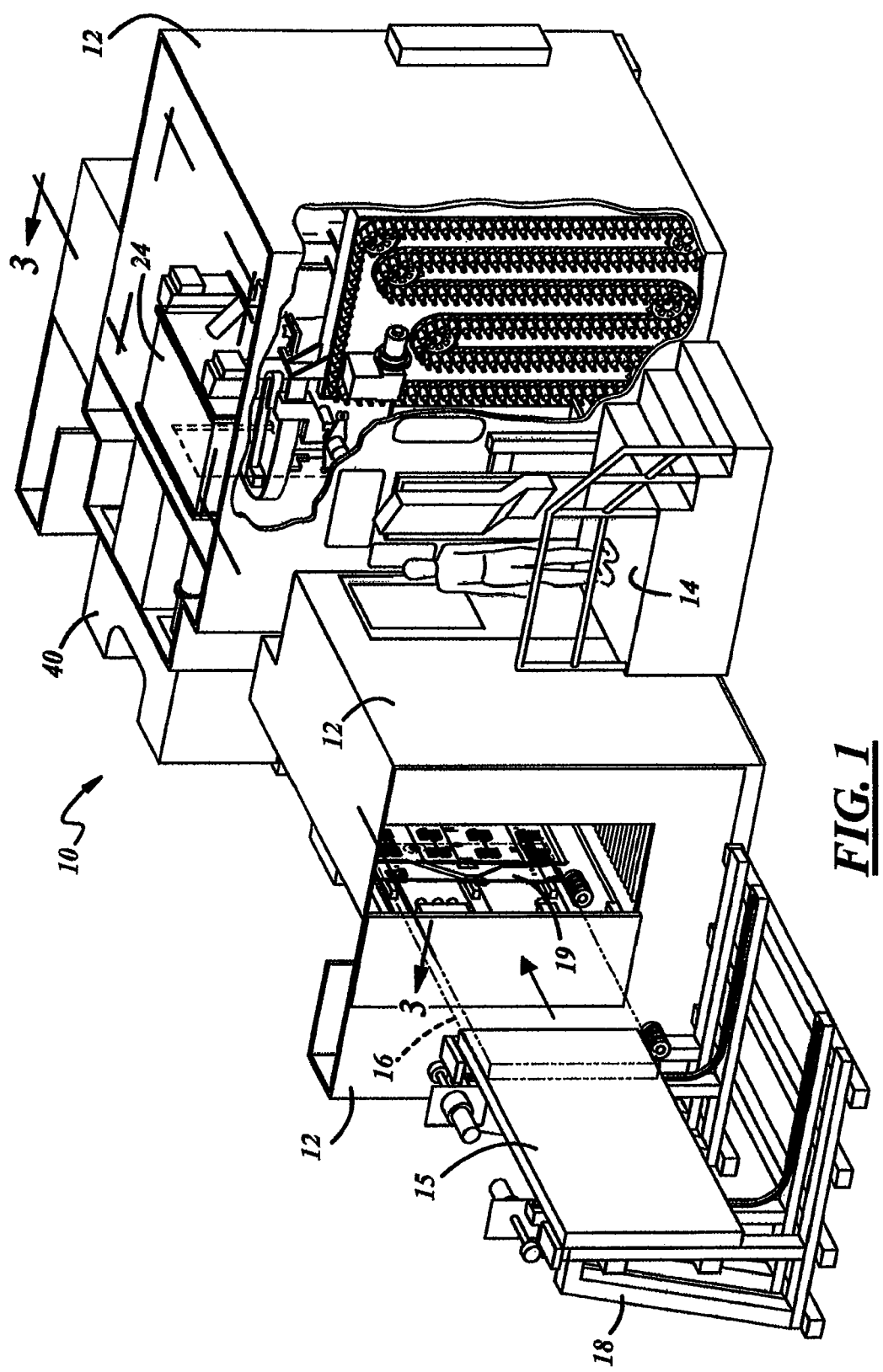
FIG. 1 is a perspective view of a machine tool according to the invention.
Figure 2:
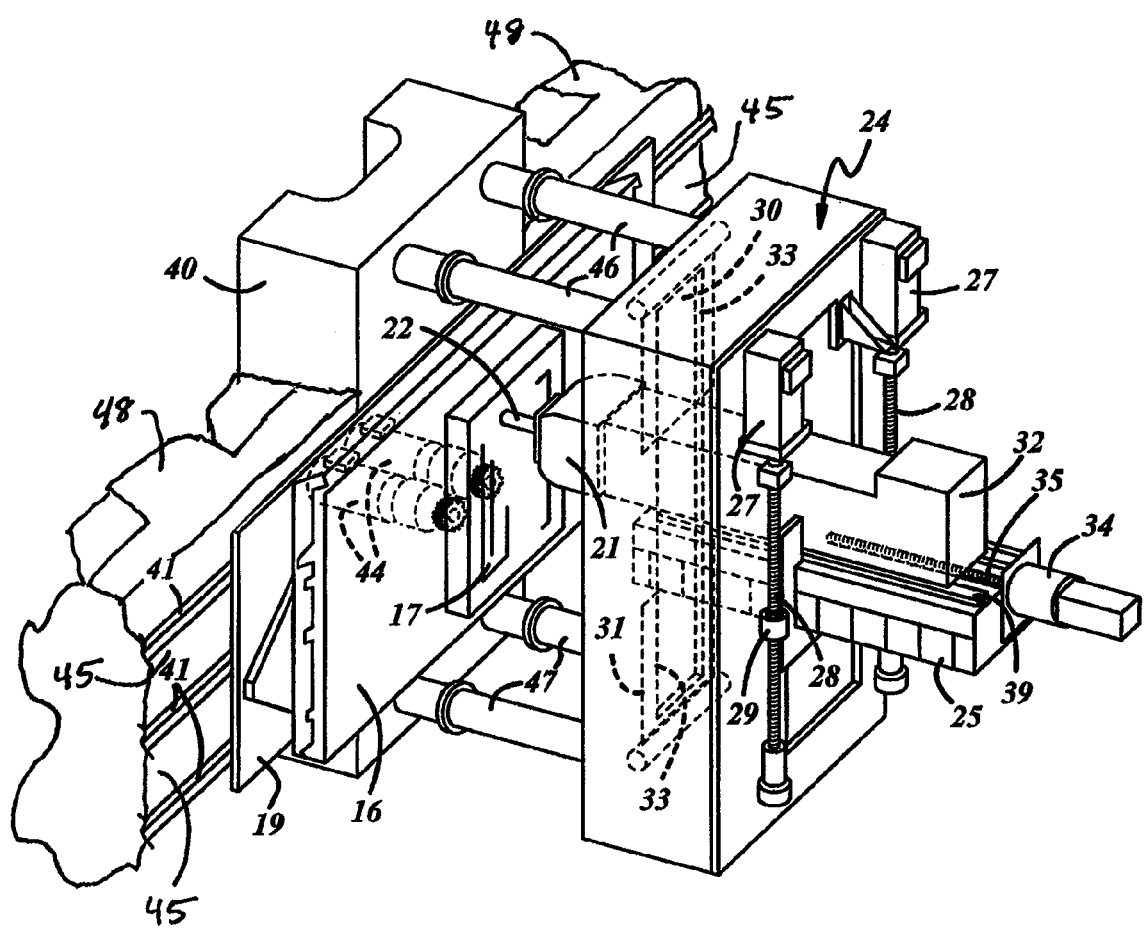
FIG. 2 is a simplified view of the machine tool of FIG. 1 showing the X, Y, and Z elements of the machine tool.

FIG. 1 shows a machine tool generally designated by the reference numeral 10. The machine tool is surrounded by standard guarding 12, and an operator station 14 is positioned outside of the guarding. The machine tool receives a pallet 16 from the pallet support plate 15 of a pallet manipulator 18 that may be positioned on the side of the machine tool. The pallet will normally have a workpiece 17 clamped to it as shown in FIG. 2. In operation, the pallet 16 is transferred from the pallet manipulator 18 to a pallet receiver 19 positioned inside of the guarding. The machine then drives the pallet receiver 19 to the working zone of the machine tool in front of the working tool.

FIG. 2 shows the X, Y, and Z-axis elements of the machine tool. A pallet with a workpiece is positioned in front of a spindle or multi-axis head 21 that carries the working tool 22 and this establishes a workzone. The Y-axis column 24 is fixed and is bifurcated. As shown in FIG. 2 and also in FIG. 3, the Y-axis column 24 carries a vertically movable saddle 25 that is mounted on vertical linear guides or ways 26. A servomotor 27 is mounted on each side of the Y-axis column 24, and each servomotor 27 is coupled to a drive screw 28. The drive screws 28 engage drive nuts 29 on opposite sides of the saddle 25, and the servomotors 27 are used to raise and lower the saddle to the desired vertical position.

Upper and lower Y-axis covers 30 and 31, respectively, are mounted on the side of the Y-axis column 24 that is closest to the workzone. The covers close the opening 33 in the bifurcated column and prevent coolant and machining debris generated in the workzone from passing through the opening 33. Although the covers 30 and 31 are shown as roll type covers, other cover arrangements such as telescoping or sliding panels as well known in the art may be used to cover the opening 33 above the Z-axis slide 32 and below the saddle 25. The covers 30 and 31 adjust to accommodate the vertical position of the slide 32 and the saddle 25. The covers 30 and 31 work together to form a Y-axis shield. The servomotors 27, the drive screws 28, the drive nuts 29, and the Y-axis ways 26 are all located on the opposite side of the column 24 from the working tool 22 and are on the outside of the machine. As a result, the motors 27, drive screws 28, drive nuts 29, and Y-axis ways 26 can all be removed from the machine without having to disturb seals or Y-axis covers. Because the drive elements for the saddle 25 are mounted on the column 24 which is stationary, the mass of the moving parts of the Y-axis drive for the machine is reduced. The term "outside of the machine" as used herein does not mean outside of the guarding 12 of the machine, but rather outside of or on the perimeter of the X, Y, and Z-axis elements of the machine.

The vertically movable saddle 25 carries a Z-axis slide 32 that is mounted on one or more Z-axis ways 39. A Z-axis drive assembly comprises a servomotor 34 and a drive screw 35 that are mounted on the Z-axis saddle 25. The Z-axis drive assembly may be selectively controlled to position the Z-axis slide 32 and the working tool 22 in the desired position along the Z-axis. The Z-axis drive motor 34 is placed on the opposite side of the Y-axis column 24 from the working tool 22 in the workzone. This allows the removal of the Z-axis slide 32 and the Z-axis drive motor 34 from the outside of the machine for maintenance purposes, and positions the Z-axis servomotor 34 and drive screw 35, and the Z-axis ways 39 outside of the machine, and shielded by the Y-axis covers 30 and 31 from coolant and other debris that are scattered during a machining operation.

X-axis frame members 40 and 48 support an X-axis wall which extends along the back of the workzone. A plurality of X-axis rails 41 are mounted on the wall 45. The pallet receiver 19 is mounted on the X-axis rails 41 for horizontal movement along the X-axis. The pallet receiver carries a vertically mounted pallet 16 on which a workpiece 17 may be mounted. One or more X-axis drive motors 44 shown in phantom are used to drive the pallet receiver back and forth along the X-axis rails. The X-axis frame member 40 is coupled to the Y-axis column by upper and lower tubular frame members 46 and 47, respectively.

Figure 3:
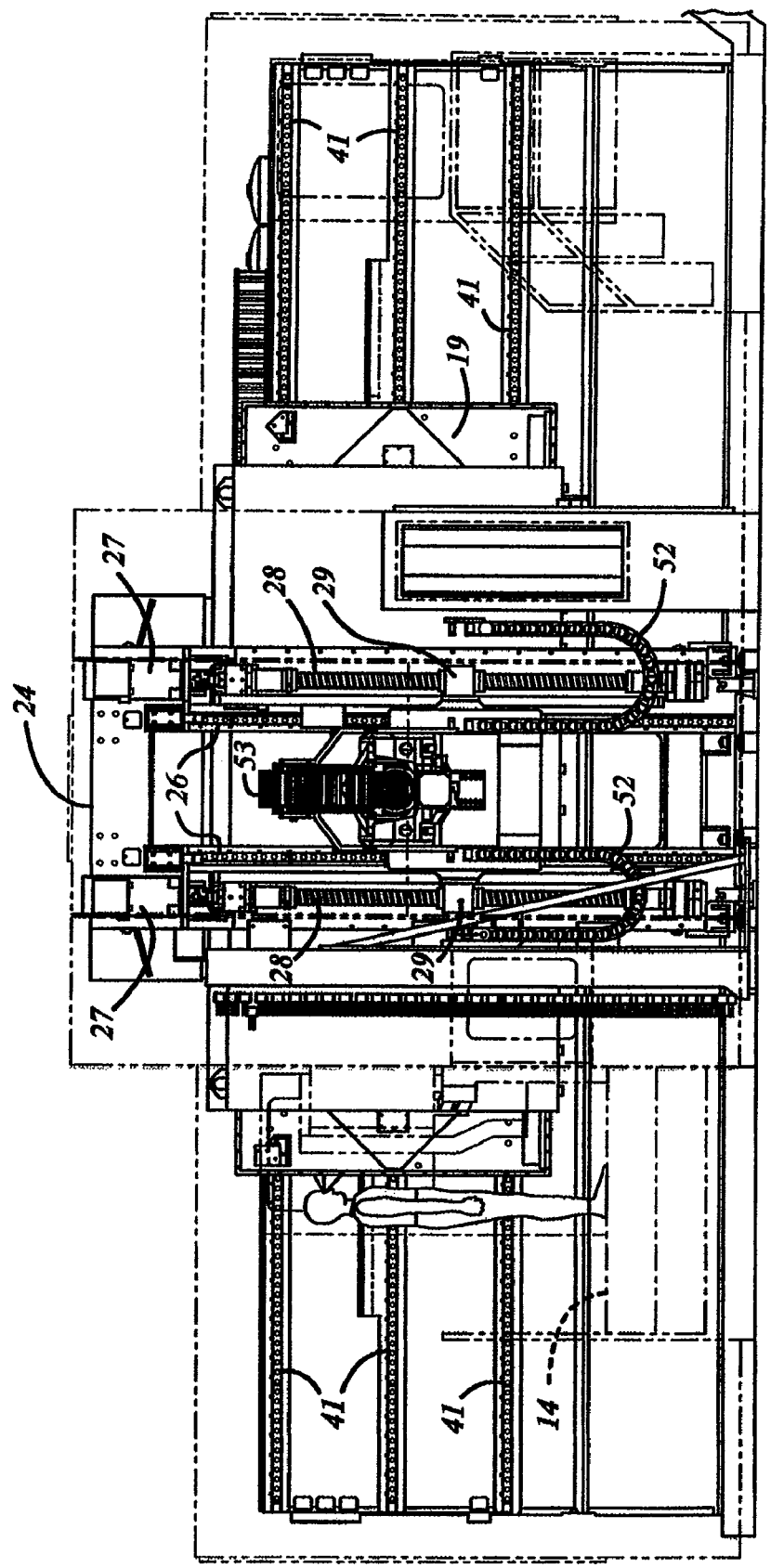
FIG. 3 is a sectional view taken along lines 3-3 of FIG. 1 showing the Y-axis column and other elements of the machine tool.

FIG. 3 shows certain elements of the machine in greater detail. The two Y-axis ways 26 that guide the vertical movement of the saddle 25 are positioned on the bifurcated column 24 on either side of the saddle. Two Y-axis flexible cable guides 52 are provided to carry electrical and hydraulic cables and the like from the stationary part of the Y-axis column to the movable saddle 25. A Z-axis flexible cable guide 53 is provided to carry electrical and hydraulic cables from the saddle 25 to the Z-axis slide 32. FIG. 3 shows the X-axis rails 41 that extend from one side of the machine to the other to support the pallet receiver 19 and to position the workpiece in front of the working tool 22. The pallet receiver 19 is centered in front of the Y-axis column 24.

Figure 4:
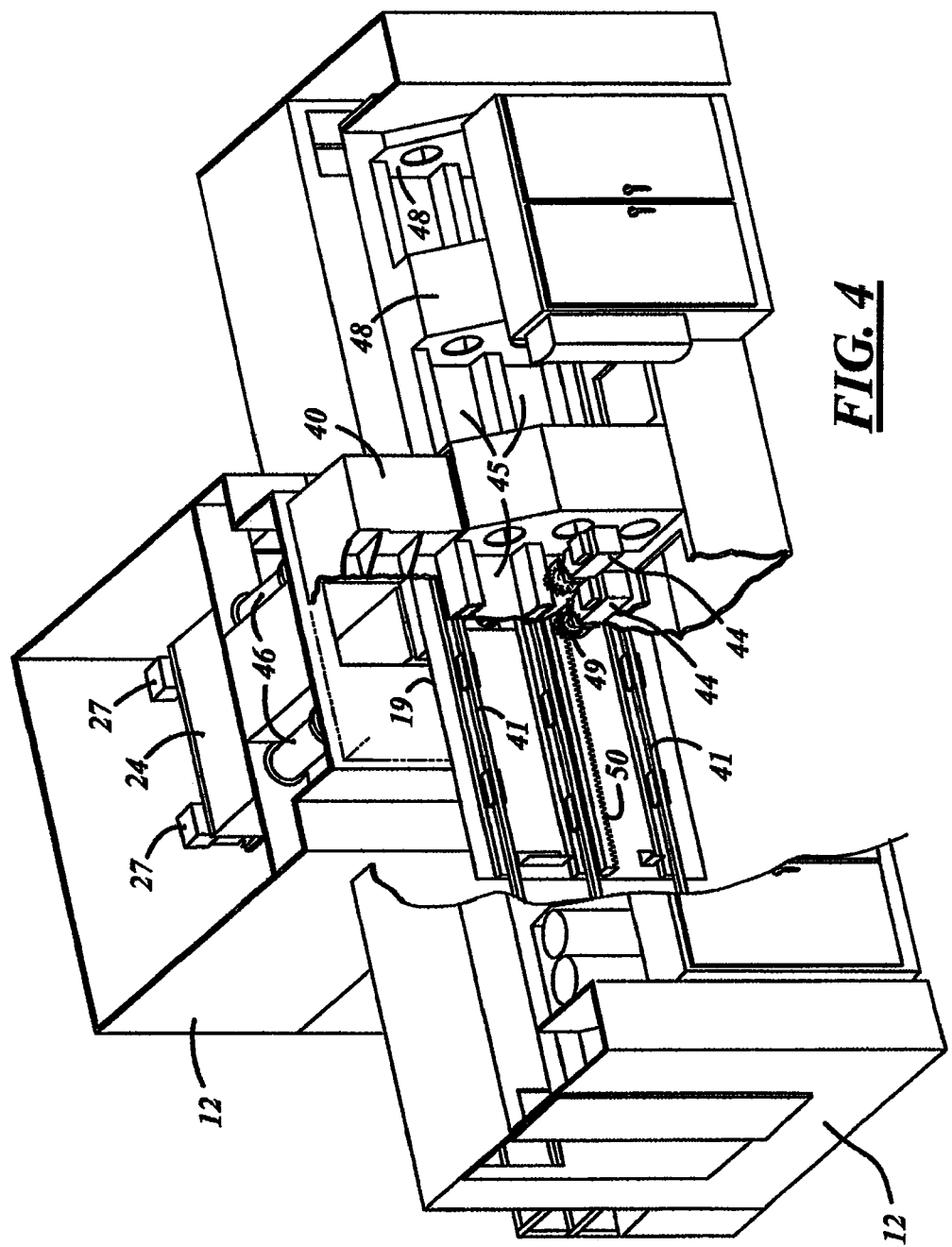
FIG. 4 is a perspective view partly broken to show the X-axis frame members, the back of the pallet receiver and the X-axis drive.

FIG. 4 is a perspective view of the back of the machine tool showing the X-axis frame members 40 and 48 that support the X-axis rails 41. The X-axis drive motors 44 are mounted on an X-axis wall 45 that is supported by the X-axis frame members 40 and 48. The X-axis wall 45 extends from one side of the machine to the other, and shields the X-axis drive motors 44 from coolant and other machining debris that are generated in the workzone. The output shafts of the drive motors are provided with pinion gears 49. The pinion gears are engaged with an elongated rack 50 on the rear face of the pallet receiver 19. The pallet receiver may be driven back-and-forth across the X-axis frame members by the X-axis drive motors 44. In the embodiment shown, two X-axis drive motors are used, although other drive configurations are possible.

Because the X-axis drive motors 44 are positioned on the X-axis wall 45 on the outside of the machine tool, the X-axis drive motors do not have to be shielded from the workzone debris by workzone covers. Further, the X-axis drive motors 44 are removable from the outside of the machine without the requirement for maintenance personnel to enter the workzone or remove workzone covers in order to have access to these elements. Additionally, positioning the X-axis drive motors 44 on a stationary part of the machine reduces the mass of the moving X-axis elements of the machine.

Having thus described the invention, various alterations and modifications may be apparent to those skilled in the art, which modifications and alterations are intended to be within the scope of the invention as defined by the appended claims.

We claim:

1. A machine tool having an X, Y, and Z-axis and a movable spindle located in a workzone for machining a workpiece, the machine tool comprising:

an X-axis drive mounted on a stationary part of the machine tool for positioning the workpiece in front of the spindle;

a Y-axis drive mounted on a stationary bifurcated column of the machine tool for positioning the spindle in a desired location along the Y-axis relative to the workpiece, the Y-axis drive including Y-axis drive motors mounted on the bifurcated column on either side of the spindle, drive screws coupled to the drive motors for driving the spindle along the Y-axis, and vertical ways mounted on the column for guiding movement of the spindle;

a Z-axis drive for positioning the spindle in a desired location along the Z-axis relative to the workpiece, wherein the X, Y, and Z axis drives are all located on the outside of the machine tool;

and wherein the column is located between the workzone and the Y-axis drive motors and drive screws.

2. The machine tool of claim 1 further comprising:

a pallet receiver for transporting a pallet along the X-axis, wherein the X-axis drive is for the pallet receiver.

3. The machine tool of claim 1 wherein the column is a fixed Y-axis column, wherein the Y-axis drive is positioned on the opposite side of the Y-axis column from the workzone, and Y-axis covers are mounted on the Y-axis column and shield the Y-axis drive from the workzone.

4. The machine tool of claim 3 further comprising:

a movable saddle mounted on the bifurcated column;

wherein the Y-axis drive motors are mounted on the bifurcated column on either side of the saddle;

wherein the drive screws are coupled to the drive motors for driving the saddle along the Y-axis;

wherein the vertical ways are mounted on the Y-axis column for guiding the movement of the saddle; wherein the Y-axis drive motors, the drive screws, and the vertical ways are all mounted on the opposite side of the Y-axis column from the workzone.

5. The machine tool of claim 4 further comprising:

a pallet receiver for transporting a pallet along the X-axis, wherein the X-axis drive is for the pallet receiver.

6. The machine tool of claim 3, the Z-axis drive further comprising:

a Z-axis motor for driving the spindle in the Z-axis; and, one or more Z-axis ways for supporting the spindle on a saddle, wherein the Z-axis motor and the Z-axis ways are located on the opposite side of the Y-axis column from the workzone.

7. The machine tool of claim 6 further comprising:

a pallet receiver for transporting a pallet along the X-axis, wherein the X-axis drive is for the pallet receiver.

* * * * *